United States Patent
Nesfield et al.

(10) Patent No.: US 12,499,901 B2
(45) Date of Patent: Dec. 16, 2025

(54) NOISE REDUCTION USING SYNTHETIC AUDIO

(71) Applicant: Sonos, Inc., Santa Barbara, CA (US)

(72) Inventors: James Nesfield, Edinburgh (GB); Ian Ward Frank, Arlington, MA (US)

(73) Assignee: Sonos, Inc., Goleta, CA (US)

( * ) Notice: Subject to any disclaimer, the term of this patent is extended or adjusted under 35 U.S.C. 154(b) by 124 days.

(21) Appl. No.: 18/693,411

(22) PCT Filed: Sep. 28, 2022

(86) PCT No.: PCT/US2022/077154
§ 371 (c)(1),
(2) Date: Mar. 19, 2024

(87) PCT Pub. No.: WO2023/056280
PCT Pub. Date: Apr. 6, 2023

(65) Prior Publication Data
US 2024/0249740 A1 Jul. 25, 2024

Related U.S. Application Data

(60) Provisional application No. 63/261,885, filed on Sep. 30, 2021.

(51) Int. Cl.
*G10L 21/0216* (2013.01)
*G10L 25/30* (2013.01)
(Continued)

(52) U.S. Cl.
CPC .......... *G10L 21/0216* (2013.01); *G10L 25/30* (2013.01); *G10L 25/78* (2013.01); *H04R 3/005* (2013.01); *G10L 2021/02165* (2013.01)

(58) Field of Classification Search
CPC . G10L 21/0216; G10L 21/0364; G10L 25/30; G10L 25/78; G10L 2021/02165;
(Continued)

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| (Continued) | | |

FOREIGN PATENT DOCUMENTS

| | | |
|---|---|---|
| EP | 1389853 A1 | 2/2004 |
| EP | 3737115 A1 | 11/2020 |
| (Continued) | | |

OTHER PUBLICATIONS

AudioTron Quick Start Guide, Version 1.0, Mar. 2001, 24 pages.
(Continued)

*Primary Examiner* — Yogeshkumar Patel
(74) *Attorney, Agent, or Firm* — Fortem IP LLP

(57) ABSTRACT

Systems and methods for noise reduction using synthetic audio are disclosed. One or more playback devices include first microphone(s) (e.g., air-conduction microphone(s)) and second microphone(s) (e.g., bone-conduction microphone(s)). In operation, based on a user voice input, first and sound data streams are captured via the first and second microphone(s), respectively. The first sound data stream is evaluated to determine whether a noise threshold is exceeded. While the noise threshold is not exceeded, a synthetic sound data model is trained based on the first and second sound data streams. An audio output stream based on the first sound data stream is communicated to at least one second playback device. When noise is detected in the first sound data stream, a synthetic audio stream is mixed into the output audio stream. The synthetic audio stream can be produced based on the synthetic sound data model.

20 Claims, 13 Drawing Sheets

(51) Int. Cl.
*G10L 25/78* (2013.01)
*H04R 3/00* (2006.01)

(58) Field of Classification Search
CPC ...... H04R 3/005; H04R 1/46; H04R 2410/05; H04R 2460/13
See application file for complete search history.

(56) References Cited

U.S. PATENT DOCUMENTS

| | | |
|---|---|---|
| 5,923,902 A | 7/1999 | Inagaki |
| 5,933,506 A * | 8/1999 | Aoki ...................... H04R 3/005 381/94.1 |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2022/0392475 A1* | 12/2022 | Yan ........................ G10L 25/18 |

FOREIGN PATENT DOCUMENTS

| | | | |
|---|---|---|---|
| JP | 2000261534 A | * | 9/2000 |
| WO | 200153994 | | 7/2001 |
| WO | 2003093950 A2 | | 11/2003 |
| WO | 2021068120 A1 | | 4/2021 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Dec. 21, 2022, issued in connection with International Application No. PCT/US2022/077154, filed on Sep. 28, 2022, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

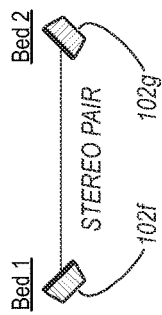
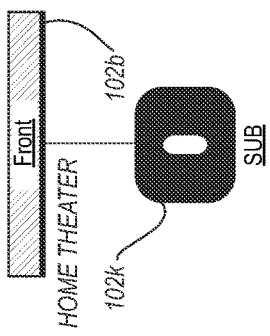
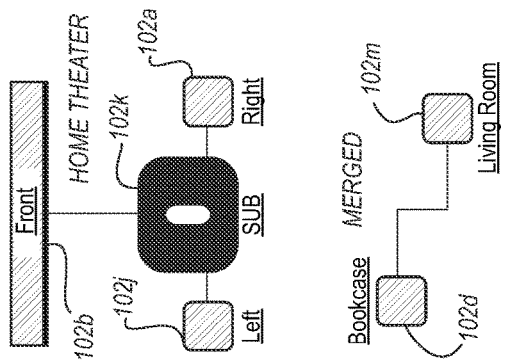
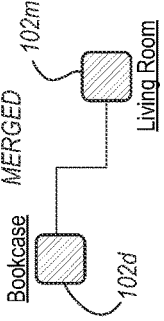
*Figure 3B*
*Figure 3C*
*Figure 3D*
*Figure 3E*
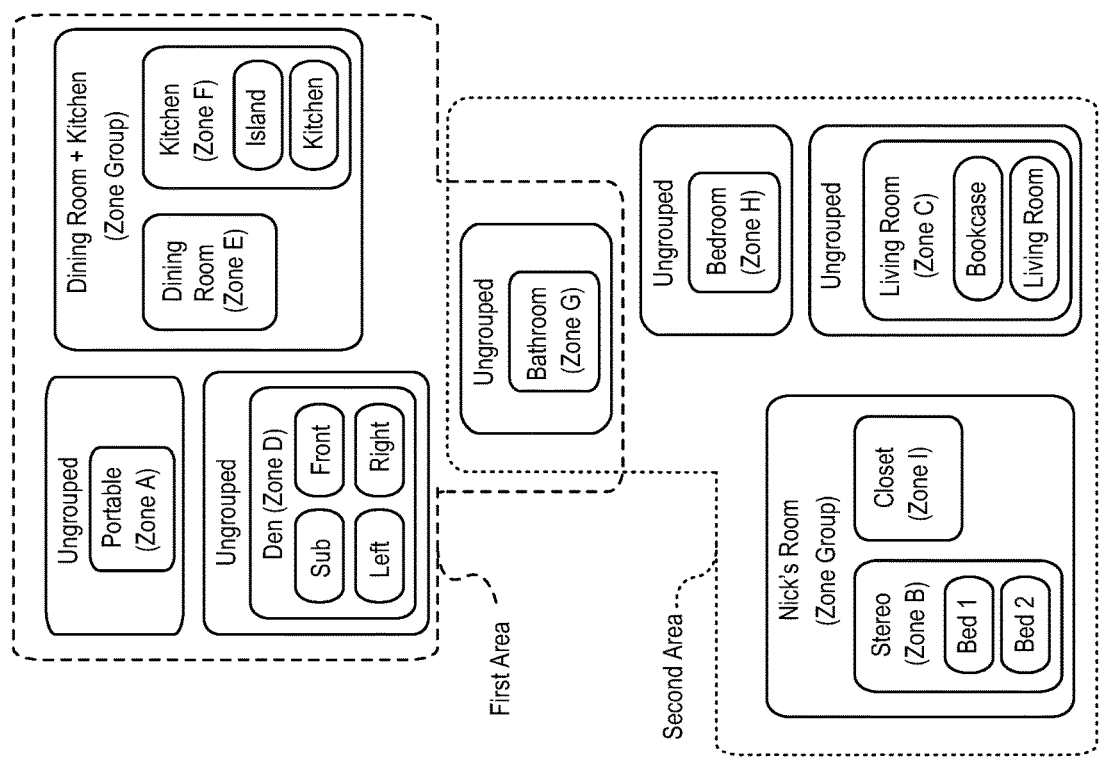
*Figure 3A*

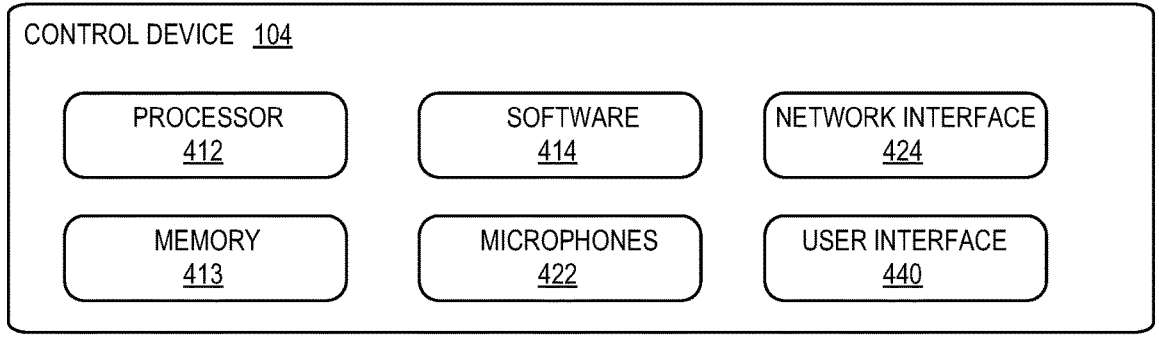
Figure 4A
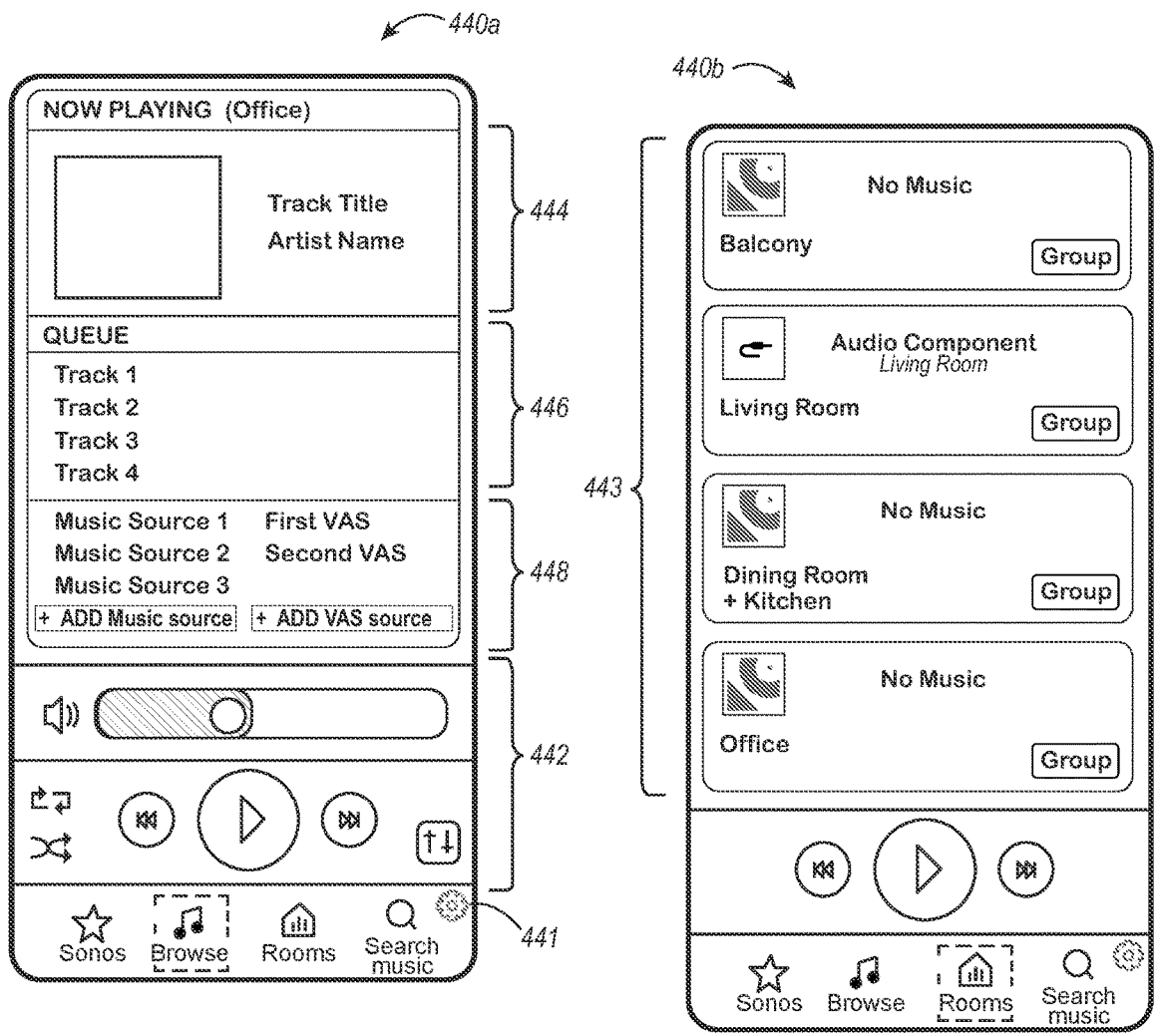
Figure 4B
Figure 4C

NOISE REDUCTION USING SYNTHETIC AUDIO

CROSS-REFERENCE TO RELATED APPLICATION

This application is a 371 national phase application of International Application No. PCT/UN202/077154, filed Sep. 28, 2022, which claims the benefit of priority to U.S. Patent Application No. 63/261,885, filed Sep. 30, 2021, each of which is incorporated herein by reference in its entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIGS. 3A-3E are diagrams showing example playback device configurations in accordance with aspects of the disclosure.

FIG. 4A is a functional block diagram of an example controller device in accordance with aspects of the disclosure.

FIGS. 4B and 4C are controller interfaces in accordance with aspects of the disclosure.

Figure 1A:
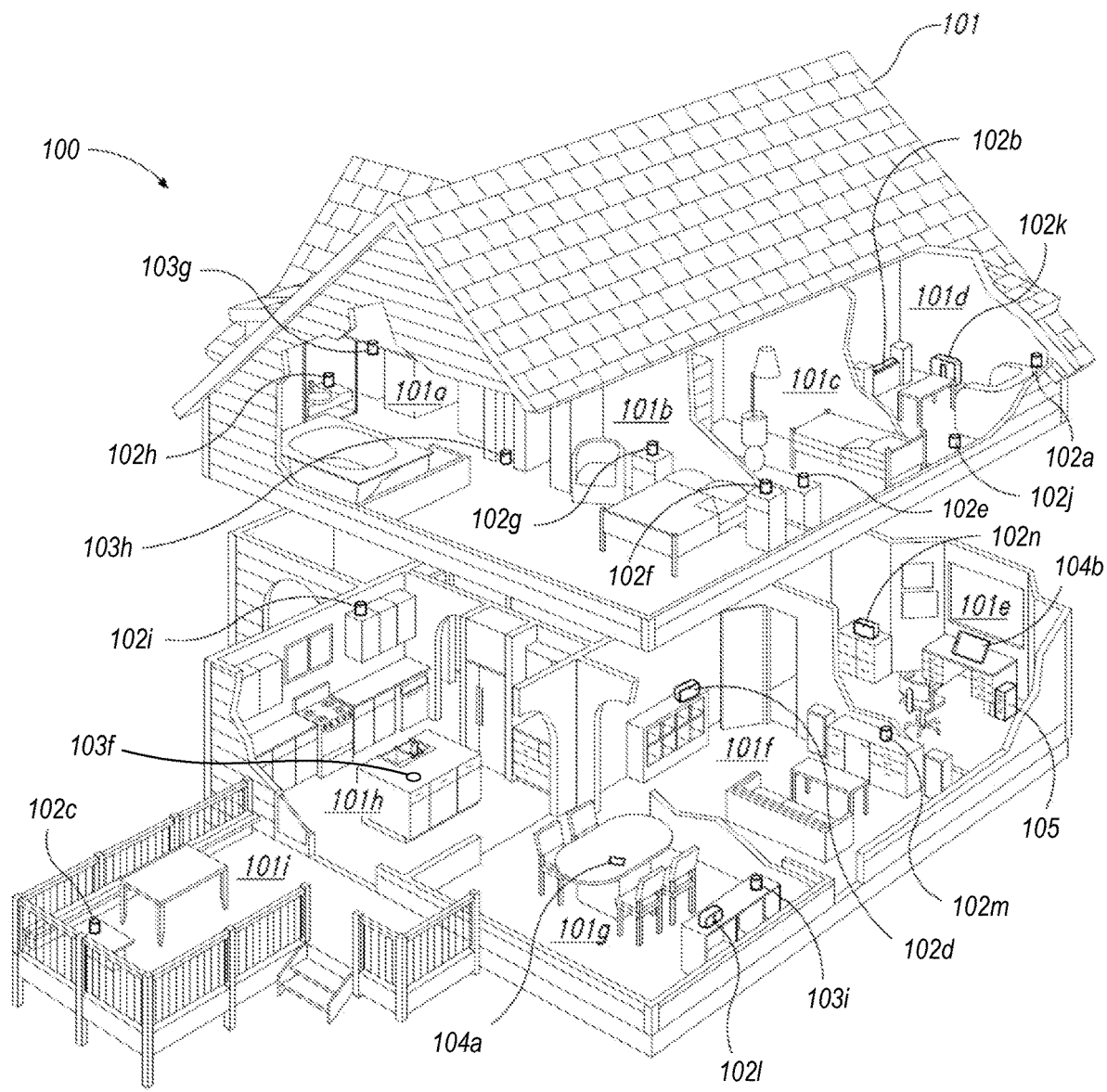
FIG. 1A is a partial cutaway view of an environment having a media playback system configured in accordance with aspects of the disclosed technology.

The drawings are for purposes of illustrating various examples, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate voice-assistant service (VAS) for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media play back system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media play back system with NMD-equipped play back devices) may be configured to interact with multiple VASes. In practice, the NMD may select one VAS over another based on the particular wake word identified in the sound detected by the NMD.

In some implementations, a playback device that is configured to be part of a networked media play back system may include components and functionality of an NMD (i.e., the play back device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." Some portable playback devices may be configured to be wearable, such as a headphone device (e.g., in-ear, around-ear, or over-ear headphones). On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary play back devices remain.

In some cases, multiple voice services are configured for the NMD, or a system of NMDs (e.g., a media play back system of playback devices). One or more services can be configured during a set-up procedure, and additional voice services can be configured for the system later on. As such, the NMD acts as an interface with multiple voice services, perhaps alleviating a need to have an NMD from each of the voice services to interact with the respective voice services. Yet further, the NMD can operate in concert with service-specific NMDs present in a household to process a given voice command.

Where two or more voice services are configured for the NMD, a particular voice service can be invoked by utterance of a wake word corresponding to the particular voice service. For instance, in querying AMAZON, a user might speak the wake word "Alexa" followed by a voice command. Other examples include "Ok, Google" for querying GOOGLE and "Hey, Siri" for querying APPLE.

In some cases, a generic wake word can be used to indicate a voice input to an NMD. In some cases, this is a manufacturer-specific wake word rather than a wake word tied to any particular voice service (e.g., "Hey, Sonos" where the NMD is a SONOS playback device). Given such a wake word, the NMD can identify a particular voice service to process the request. For instance, if the voice input following the wake word is related to a particular type of command (e.g., music play back), then the voice input is sent to a particular voice service associated with that type of command (e.g. a streaming music service having voice command capabilities).

Such voice control depends upon the accurate detection of the user's voice input via one or more microphones of the NMD. In some instances, one or more NMDs may include a plurality of different types of microphones, each of which may differ from one another along various performance characteristics (e.g., different susceptibility to certain types of noise, different acoustic sensitivities over particular frequency ranges, etc.). In accordance with some aspects of the present technology, the audio captured via each of the different types of microphones can be combined in a manner that improves overall voice detection, for example by reducing the deleterious effects of noise on the quality of the captured voice input.

In some examples, an NMD may include both one or more conventional air-conduction microphones and one or more bone-conduction microphones. Air-conduction microphones can be configured to detect acoustic waves propagating through the air and generate corresponding electrical signals, whereas the bone-conduction microphones can be configured to detect mechanical vibrations (e.g., vibrations propagating through a user's jaw bone or skull in response to the user's speech) and generate corresponding electrical signals. Air-conduction microphones may provide a clear audio signal during low-noise conditions, but may suffer in the presence of audible noise (e.g., wind noise). In contrast, bone-conduction microphones may provide a less clear audio signal than air-conduction microphones during low-noise conditions (e.g., due to the poorer capture of high-frequency audio input), while being less susceptible to certain types of noise. Bone-conduction microphones may be particularly insusceptible to high-frequency noise such as wind, which is less likely to generate mechanical vibrations that would be detected by bone-conduction microphones. Because bone-conduction microphones operate by translating vibrations sensed from the user's bones (e.g., using a transducer coupled to the user's jaw bone or skull), certain types of noise (e.g., wind, ambient noise) have a smaller impact in the audio detected via the bone-conduction microphones as compared with conventional air-conduction microphones.

In accordance with some examples of the present technology, one or more NMDs that include different types of microphones (e.g., one or more air-conduction microphones and one or more bone-conduction microphones) can utilize the outputs of each microphone type in a manner that improves the quality of captured audio, and particularly can improve the accuracy of voice detection and processing. In one implementation, a single NMD may include both air-conduction and bone-conduction microphones. During low-noise conditions, the audio output can be entirely or substantially composed of the audio captured via the air-conduction microphone(s). During high-noise conditions, however, the audio output can be entirely or partially composed of audio captured via the bone-conduction microphone(s). However, because audio captured via bone-conduction microphones tends to be less clear (e.g., muddier due to the loss of high-frequency components), the audio captured via the bone-conduction microphones can be manipulated to more closely correspond to the characteristics of that same audio captured via air-conduction microphones in the absence of noise. For example, a mathematical model can be constructed and implemented in software that transforms outputs from a first microphone type (e.g., a bone-conduction microphone) into outputs that simulate or approximate at least to some extent the outputs from a second microphone type (e.g., an air-conduction microphone).

Such a model can take the form of a machine-learned model that is trained using simultaneous audio capture via both microphone types and during low-noise conditions. In operation, the model-generation process may monitor for noise in the captured sound data. If noise is detected, then the captured data is not used for training. If, in contrast, no noise (or low noise) is detected, then the model-generation process involves storing a dataset of audio captured via both microphone types. This dataset can then be used to generate or update a model that maps a first output (e.g., audio captured via bone-conduction microphones) onto a second corresponding output (e.g., audio captured via air-conduction microphones). The output of such a model, which processes one microphone input type (e.g., bone-conduction microphone input) to simulate another type of microphone input (e.g., air-conduction microphone input), is referred to herein as "synthetic sound" or "synthetic audio."

During operation of an NMD, a single input (e.g., user voice input) can be detected via both microphone types (e.g., air-conduction microphones and bone-conduction microphones). Depending on the particular conditions, the output for downstream processing may be either (1) the air-conduction output alone, (2) synthetic audio using the bone-conduction output alone, or (3) some combination of the two. The first option may be appropriate where there is little or no noise present and as such the input captured by the air-conduction microphones is acceptable in quality and character. The second option (outputting only the bone-conduction output as processed using a model to mimic the characteristics of air-conduction microphones) may be useful when high-frequency noise is severe enough to create audible artifacts and deterioration in sound quality in air-conduction input. The third option involves mixing the air-conduction output and that of the bone-conduction output. This mixing can take a number of forms depending on the desired performance and the characteristics of the captured audio. In some examples, mixing includes the superposition of the two outputs with relative volume levels varied to the desired levels (e.g., bone-conduction and air-conduction each at 50% volume, optionally with cross-fading between them as the relative volume levels are varied). In some examples, the mixing can include utilizing the air-conduction output over a first frequency range and utilizing the synthetic audio output over a second frequency range, which may partially overlap the first or may be non-overlapping with the first. For example, frequencies above a predetermined threshold can be obtained from the synthetic audio output, while frequencies below the predetermined threshold can be obtained from the air-conduction audio output. In another example, detected noise may be confined to a particular frequency band. In such instances, synthetic audio can be used for that frequency band, while the frequency ranges outside that band can be obtained from the air-conduction microphones. In another example, detected noise may be confined substantially to a particular frequency band. In such instances, synthetic audio can be used for that frequency band, while the frequency ranges outside that band can be obtained from the air-conduction microphones. In various examples, any suitable technique can be used to combine, mix, aggregate, or merge the air-conduction audio and the synthetic audio streams for downstream audio processing.

In several examples disclosed herein, a single NMD includes multiple different types of microphones (e.g., at least one air-conduction microphone and at least one bone-conduction microphone). In various examples, the different types of microphones can take other forms or vary in other characteristics (e.g., having different constructions, frequency responses, sensitivities, etc.). In at least some examples, a system can include multiple NMDs of the same or different type that are distributed spatially within an environment such that each NMD detects somewhat distinct voice inputs or other sound data. In such situations, the audio captured via the different input devices can be modulated, toggled, combined, etc. in a manner similar to those of different microphones housed within a single NMD.

While some examples described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
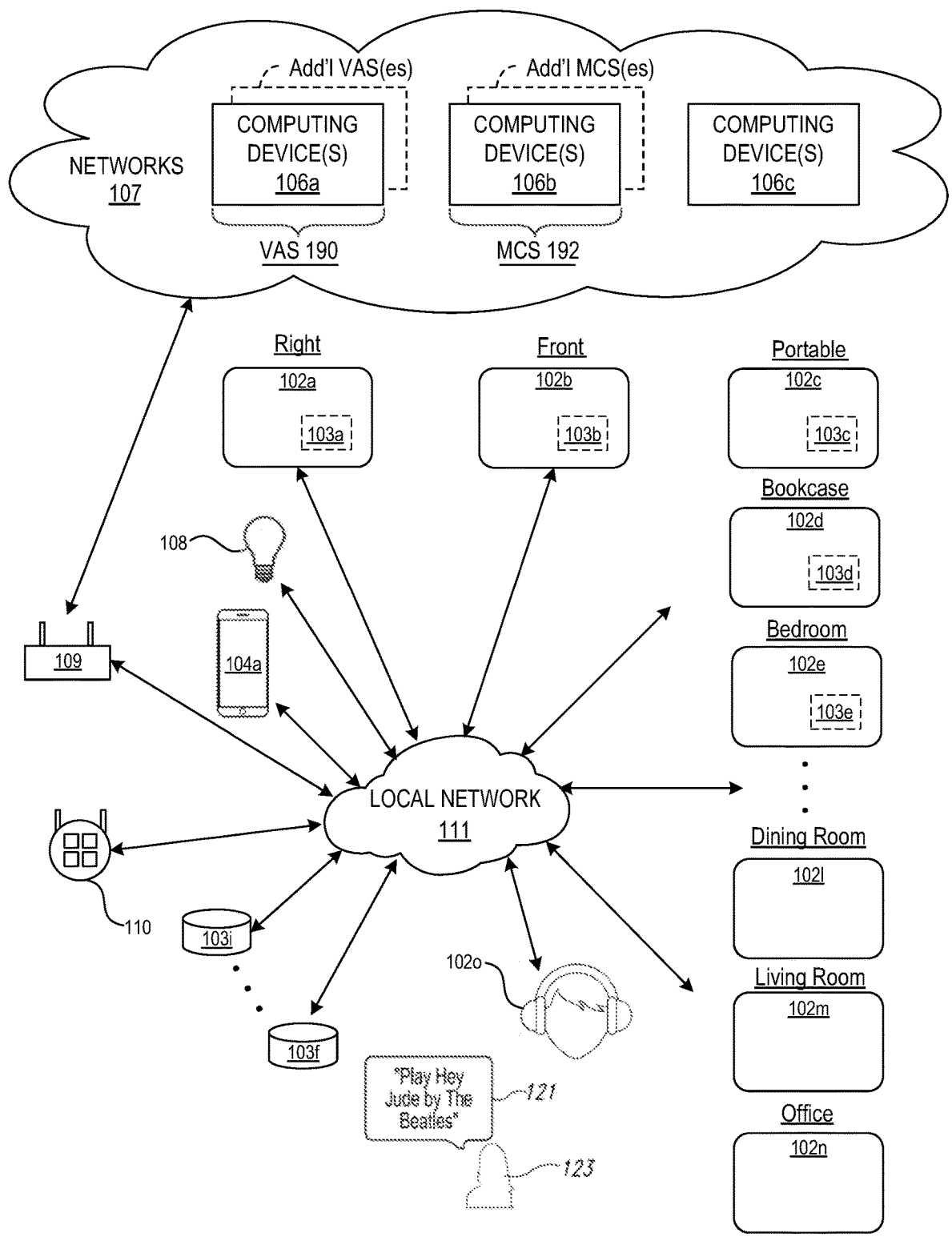
FIG. 1B is a schematic diagram of the media playback system of FIG. 1A and one or more networks.

FIGS. 1A and 1B illustrate an example configuration of a media play back system 100 (or "MPS 100") in which one or more examples disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In examples described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related example, the Left playback device 102j may communicate with other network devices, such as the playback device 102b, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some examples, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the play back devices 102 may take the form of or include an on-board (e.g., integrated) network microphone device. For example, the play back devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various play back and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to play back device 102d because it is physically situated on a bookcase. Similarly, the NMD 103f may be assigned the named "Island" because it is physically situated on an island countertop in the Kitchen 101h (FIG. 1A). Some play back devices may be assigned names according to a zone or room, such as the play back devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media play back in the zone of the Den 101d (FIG. 1A). The play back device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some examples, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room play back device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and play back devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single play back device 102 and/or a single NMD 103. In some examples of such cases, the LAN 111 (FIG. 1B) may be eliminated and the single play back device 102 and/or the single NMD 103 may communicate directly with the remote computing devices 106a-d. In some examples, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
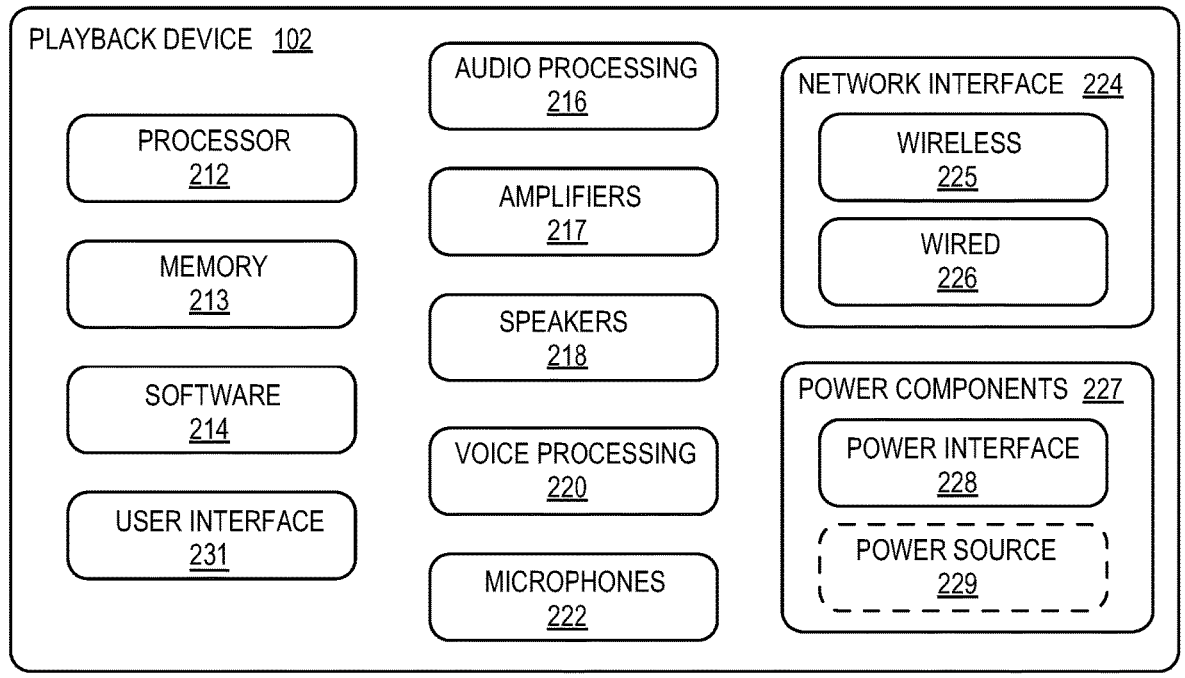
FIG. 2A is a functional block diagram of an example playback device.

FIG. 2A is a functional block diagram illustrating certain aspects of one of the play back devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the play back device 102 retrieving audio data from an audio source, which may be another play back device. In another example, the functions may involve the play back device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below:

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among play back devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for play back.

The produced audio signals may then be provided to one or more audio amplifiers 217 for amplification and play back through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the play back device to external speakers. In certain examples, a playback device may include neither the speakers 218 nor the audio amplifiers 217, but instead may include an audio interface (not shown) for connecting the playback device to an external audio amplifier or audio-visual receiver.

In addition to producing audio signals for playback by the play back device 102, the audio processing components 216 may be configured to process audio to be sent to one or more other play back devices, via the network interface 224, for playback. In example scenarios, audio content to be processed and/or played back by the play back device 102 may be received from an external source, such as via an audio line-in interface (e.g., an auto-detecting 3.5 mm audio line-in connection) of the playback device 102 (not shown) or via the network interface 224, as described below:

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the play back device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the play back device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the play back device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In some examples, the microphones 222 of a single playback device can include different types of microphones that have different performance characteristics. For example, the microphones 222 can include one or more first microphones of a first type and one or more second microphones of a second type. In various examples, there may be two, three, four, or more different types of microphones on the same device or distributed among different devices in the same environment. As described in more detail elsewhere herein, by utilizing the outputs of each type of microphone, the sound data output from the microphone array can be enhanced, for example by improving the probability of accurate voice detection. In some examples, such as in the case of a wearable playback device (e.g., a headphone device), the microphones can include one or more conventional air-conduction microphones in addition to one or more bone-conduction microphones configured to be coupled to the user's bone(s) (e.g., pressed against the user's jaw, cheek, temple, etc.). In operation, during low noise conditions, the air-conduction microphones may generally capture clearer sound data than the bone-conduction microphones. However, during high noise conditions (e.g., high wind noise), the air-conduction microphones may capture poorer quality sound data than the bone-conduction microphones (i.e., the bone-conduction microphones may be less susceptible to wind noise than the air-conduction microphones). In such instances, audio captured via the bone-conduction microphones can be used to replace, augment, or combine with audio captured via the air-conduction microphones. As described in more detail elsewhere herein, audio captured via the bone-conduction microphones can be used to synthesize an audio output with improved quality for voice detection and other downstream processes.

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. patent application Ser. No. 15/438,749.

As further shown in FIG. 2A, the play back device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable play back device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various examples, the user interface 240 includes one or more physical buttons and/or supports graphical interfaces provided on touch sensitive screen(s) and/or surface(s), among other possibilities, for a user to directly provide input. The user interface 240) may further include one or more of lights (e.g., LEDs) and the speakers to provide visual and/or audio feedback to a user.

Figure 2B:
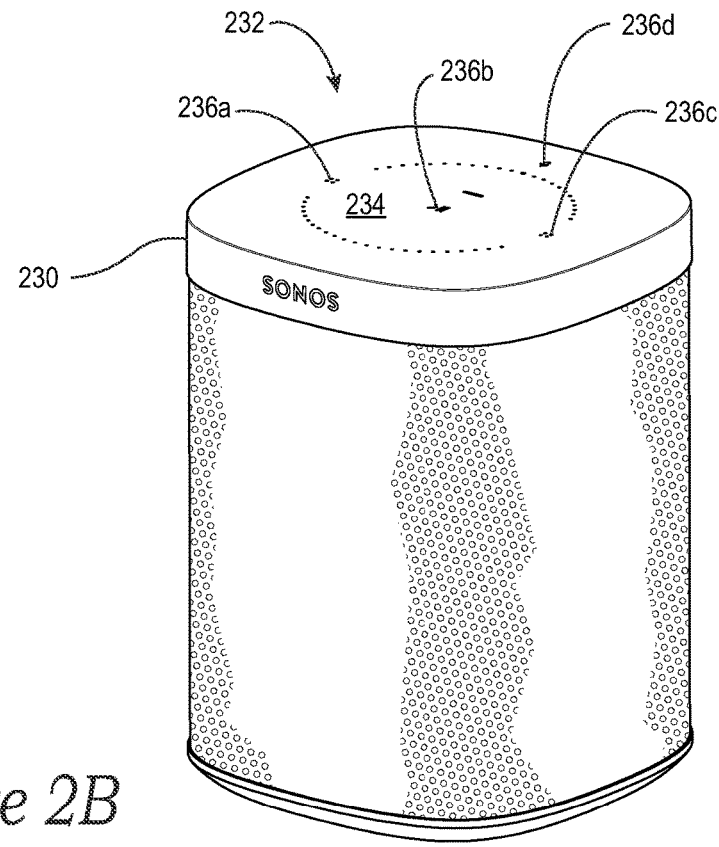
FIG. 2B is an isometric diagram of an example housing of the play back device of FIG. 2A.

As an illustrative example, FIG. 2B shows an example housing 230 of the play back device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230) so as to detect sound from one or more directions relative to the play back device 102.

Figure 2C:
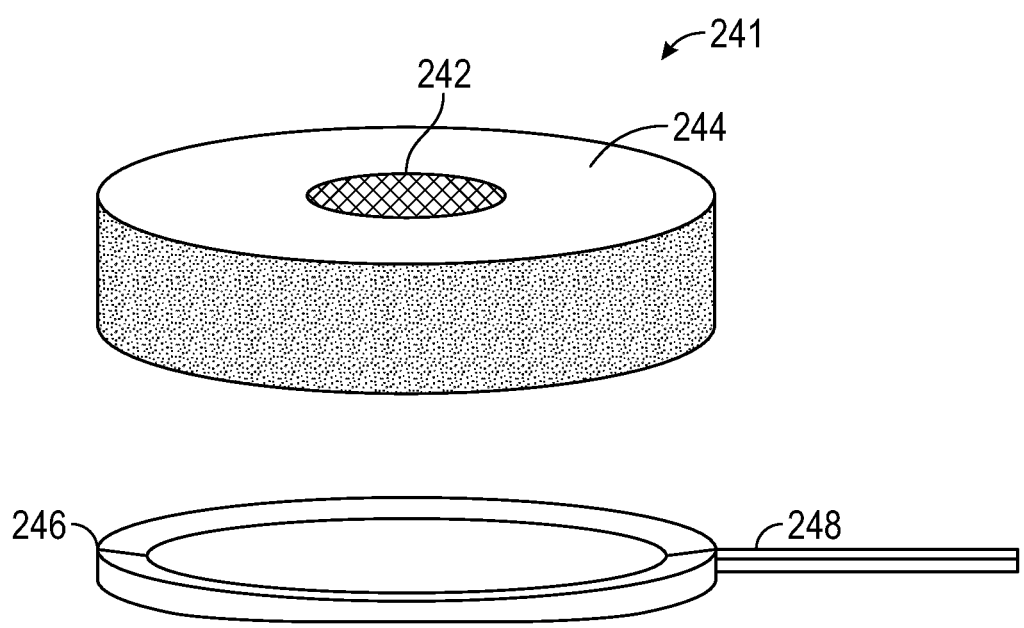
FIG. 2C is a diagram of another example housing for the playback device of FIG. 2A.

As mentioned above, the playback device 102 may be constructed as a portable playback device, such as an ultra-portable playback device, that comprises an internal power source. FIG. 2C shows an example housing 241 for such a portable playback device. As shown, the housing 241 of the portable playback device includes a user interface in the form of a control area 242 at a top portion 244 of the housing 241. The control area 242 may include a capacitive touch sensor for controlling audio playback, volume level, and other functions. The housing 241 of the portable playback device may be configured to engage with a dock 246 that is connected to an external power source via cable 248. The dock 246 may be configured to provide power to the portable play back device to recharge an internal battery. In some examples, the dock 246 may comprise a set of one or more conductive contacts (not shown) positioned on the top of the dock 246 that engage with conductive contacts on the bottom of the housing 241 (not shown). In other examples, the dock 246 may provide power from the cable 248 to the portable playback device without the use of conductive contacts. For example, the dock 246 may wirelessly charge the portable playback device via one or more inductive coils integrated into each of the dock 246 and the portable playback device.

Figure 2D:
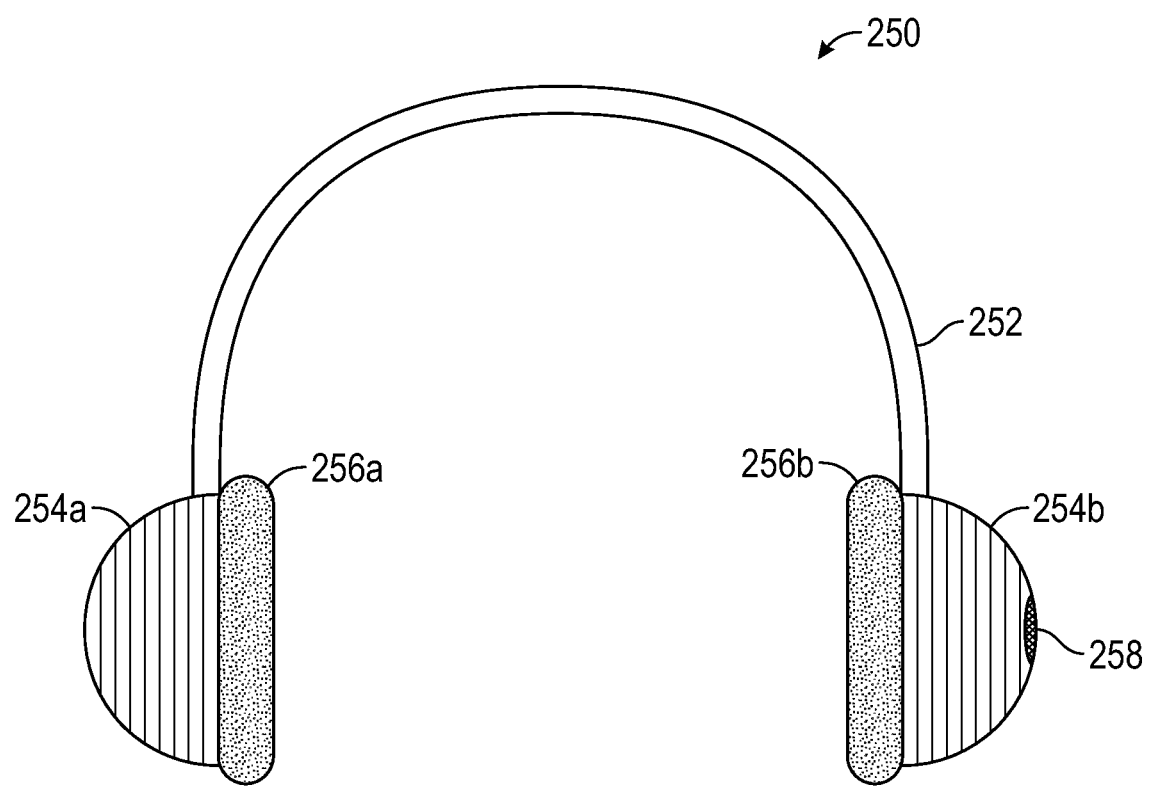
FIG. 2D is a diagram of another example housing for the playback device of FIG. 2A.

In some examples, the play back device 102 may take the form of a wired and/or wireless headphone (e.g., an over-ear headphone, an on-ear headphone, or an in-ear headphone). For instance, FIG. 2D shows an example housing 250 for such an implementation of the play back device 102. As shown, the housing 250 includes a headband 252 that couples a first earpiece 254a to a second earpiece 254b. Each of the earpieces 254a and 254b may house any portion of the electronic components in the playback device, such as one or more speakers, and one or more microphones. In some instances, the housing 250 can enclose or carry one or more first microphones (e.g., air-conduction microphone(s)) and one or more second microphones (e.g., bone-conduction microphone(s) disposed about the housing in a manner so as to press against a user's jawbone, skull, or other suitable location). Further, one or more of the earpieces 254a and 254b may include a control area 258 for controlling audio playback, volume level, and other functions. The control area 258 may comprise any combination of the following: a capacitive touch sensor, a button, a switch, and a dial. As shown in FIG. 2D, the housing 250 may further include ear cushions 256a and 256b that are coupled to earpieces 254a and 254b, respectively. The ear cushions 256a and 256b may provide a soft barrier between the head of a user and the earpieces 254a and 254b, respectively, to improve user comfort and/or provide acoustic isolation from the ambient (e.g., passive noise reduction (PNR)). In some implementations, the wired and/or wireless headphones may be ultraportable playback devices that are powered by an internal energy source and weigh less than fifty ounces.

Figure 2E:
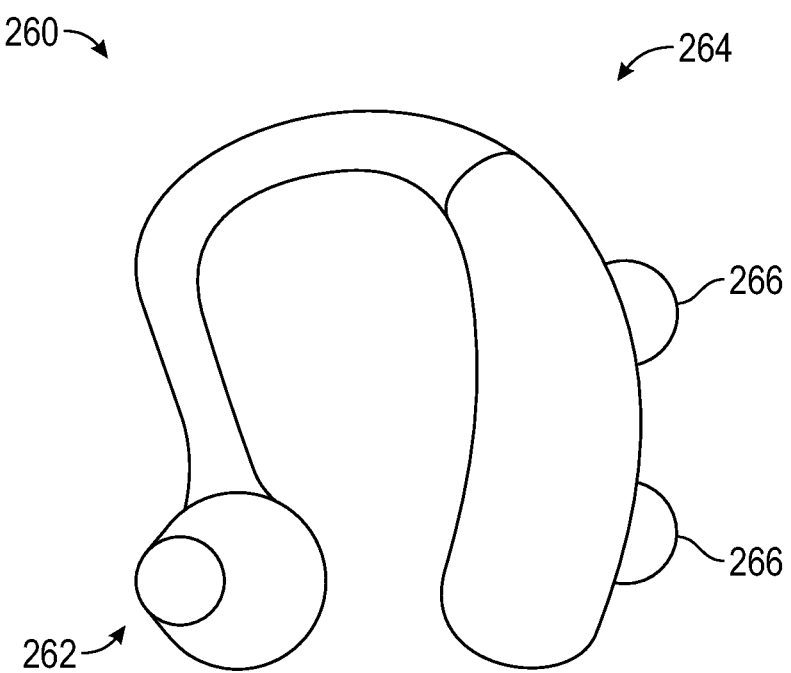
FIG. 2E is a diagram of another example housing for the playback device of FIG. 2A.

In some examples, the playback device 102 may take the form of an in-ear headphone device. For instance, FIG. 2E shows an example housing 260 for such an implementation of the play back device 102. As shown, the housing 260 includes an in-ear portion 262 configured to be disposed in or adjacent a user's ear, and an over-ear portion 264 configured to extend over and behind a user's ear. The housing 260 may house any portion of the electronic components in the playback device, such as one or more audio transducers, microphones, and audio processing components. In some instances, the housing 260 can enclose or carry one or more first microphones (e.g., air-conduction microphone(s)) and one or more second microphones (e.g., bone-conduction microphone(s) disposed about the housing in a manner so as to press against a user's jaw bone, skull, or other suitable location). A plurality of control areas 266 can facilitate user input for controlling audio playback, volume level, noise cancellation, pairing with other devices, and other functions. The control area 258 may comprise any combination of the following: one or more buttons, switches, dials, capacitive touch sensors, etc.

It should be appreciated that the play back device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the play back device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of play back and network microphone devices have been described above with respect to FIGS. 2A, 2B, 2C, 2D, and 2E, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of play back device 102 is described with reference to MPS 100, one skilled in the art will recognize that play back devices as described herein can be used in a variety of different environments, including (but not limited to) environments with more and/or fewer elements, without departing from this invention. Likewise, MPSs as described herein can be used with various different playback devices.

By way of illustration, SONOS, Inc. presently offers (or has offered) for sale certain playback devices that may implement certain of the examples disclosed herein, including a "SONOS ONE," "PLAY: 1," "PLAY:3," "PLAY:5," "PLAYBAR," "AMP," "CONNECT: AMP," "PLAYBASE," "BEAM," "CONNECT," and "SUB." Any other past, present, and/or future play back devices may additionally or alternatively be used to implement the playback devices of examples disclosed herein. Additionally, it should be understood that a playback device is not limited to the examples illustrated in FIG. 2A, 2B, 2C, or 2D or to the SONOS product offerings. For example, a playback device may be integral to another device or component such as a television, a lighting fixture, or some other device for indoor or outdoor use.

b. Example Playback Device Configurations

FIGS. 3A-3E show example configurations of play back devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below; multiple playback devices may be merged to form a single zone. For example, the playback device 102d named "Bookcase" may be merged with the playback device 102m named "Living Room" to form a single Zone C. The merged play back devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various examples, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some examples, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 play back device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned play back responsibilities but may each render the full range of audio content that each respective play back device is capable of. Nevertheless, merged devices may be represented as a single UI entity (i.e., a zone, as discussed above). For instance, FIG. 3E shows the play back devices 102d and 102m in the Living Room merged, which would result in these devices being represented by the single UI entity of Zone C. In one example, the playback devices 102d and 102m may playback audio in synchrony, during which each outputs the full range of audio content that each respective play back device 102d and 102m is capable of rendering.

In some examples, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the play back device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some examples, a stand-alone NMD may not be assigned to a zone.

Zones of individual, bonded, and/or merged devices may be arranged to form a set of play back devices that play back audio in synchrony. Such a set of play back devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the play back devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some examples, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some examples, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some examples, the MPS 100 may not implement Areas, in which case the system may not store variables associated with Areas.

The memory 213 may be further configured to store other data. Such data may pertain to audio sources accessible by the playback device 102 or a play back queue that the play back device (or some other playback device(s)) may be associated with. In examples described below, the memory 213 is configured to store a set of command data for selecting a particular VAS when processing voice inputs.

During operation, one or more play back zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the play back device 102i. In another example, a playback zone may play the same audio content in synchrony with another playback zone. For instance, the user may be in the Office zone where the play back device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the play back device 102c from the Patio zone to the Office zone, the Office zone may now include both the playback devices 102c and 102n. In some cases, the user may pair or group the moved play back device 102c with the Office zone and/or rename the players in the Office zone using, for example, one of the controller devices 104 and/or voice input. As another example, if one or more play back devices 102 are moved to a particular space in the home environment that is not already a play back zone, the moved playback device(s) may be renamed or associated with a play back zone for the particular space.

Further, different play back zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front play back device 102b. The listening zone may include the Right, Left, and SUB play back devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various play back and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media play back system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a play back device, an NMD, or another network device. Likewise, the controller device 104 may transmit such system information to a play back device or another network device via the network interface 424. In some cases, the other network device may be another controller device.

The controller device 104 may also communicate play back device control commands, such as volume control and audio playback control, to a playback device via the network interface 424. As suggested above, changes to configurations of the MPS 100 may also be performed by a user using the controller device 104. The configuration changes may include adding/removing one or more play back devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a play back control region 442, a play back zone region 443, a play back status region 444, a play back queue region 446, and a sources region 448. The user interface as shown is just one example of an interface that may be provided on a network device, such as the controller device shown in FIG. 4A, and accessed by users to control a media play back system, such as the MPS 100. Other user interfaces of varying formats, styles, and interactive sequences may alternatively be implemented on one or more network devices to provide comparable control access to a media play back system.

The play back control region 442 (FIG. 4B) may include selectable icons (e.g., by way of touch or by using a cursor) that, when selected, cause playback devices in a selected play back zone or zone group to play or pause, fast forward, rewind, skip to next, skip to previous, enter/exit shuffle mode, enter/exit repeat mode, enter/exit cross fade mode, etc. The play back control region 442 may also include selectable icons that, when selected, modify equalization settings and/or playback volume, among other possibilities.

The play back zone region 443 (FIG. 4C) may include representations of playback zones within the MPS 100. The play back zones regions 443 may also include a representation of zone groups, such as the Dining Room+Kitchen zone group, as shown. In some examples, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The play back status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The play back queue region 446 may include graphical representations of audio content in a playback queue associated with the selected playback zone or zone group. In some examples, each playback zone or zone group may be associated with a playback queue comprising information corresponding to zero or more audio items for playback by the play back zone or zone group. For instance, each audio item in the playback queue may comprise a uniform resource identifier (URI), a uniform resource locator (URL), or some other identifier that may be used by a playback device in the play back zone or zone group to find and/or retrieve the audio item from a local audio content source or a networked audio content source, which may then be played back by the play back device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have play back durations. In an alternative example, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first play back queue (such as if the second playback zone was added to the first playback zone), that contains audio items from the second playback queue (such as if the first play back zone was added to the second playback zone), or a combination of audio items from both the first and second play back queues. Subsequently, if the established zone group is ungrouped, the resulting first playback zone may be re-associated with the previous first playback queue or may be associated with a new play back queue that is empty or contains audio items from the play back queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the play back queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the play back queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some examples, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some examples, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media play back system via a line-in input connection on a play back device or network device, among other possibilities.

In some examples, audio content sources may be added or removed from a media play back system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
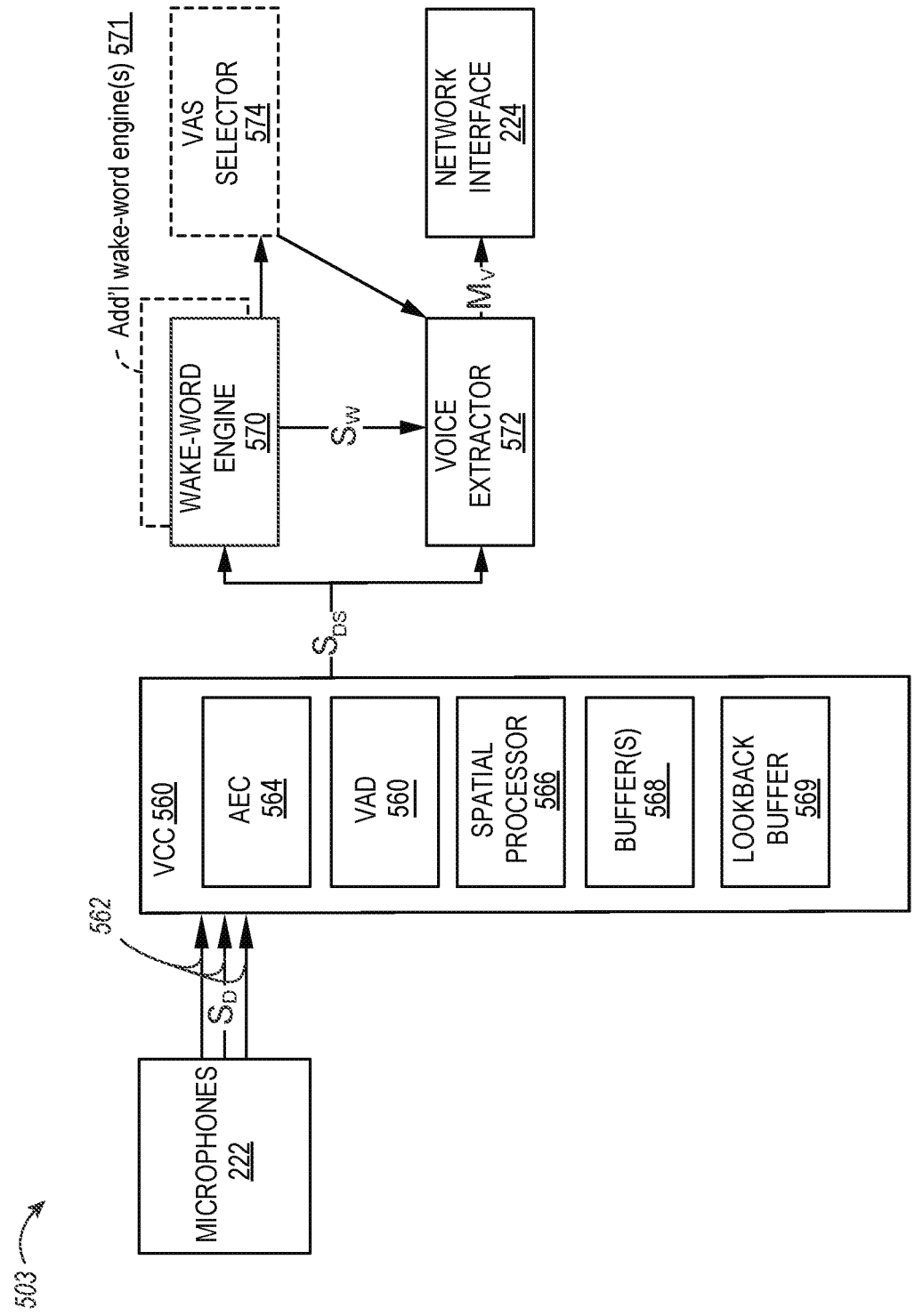
FIG. 5 is a functional block diagram of certain components of an example network microphone device in accordance with aspects of the disclosure.

FIG. 5 is a functional block diagram showing an NMD 503 configured in accordance with examples of the disclosure. The NMD 503 includes voice capture components ("VCC", or collectively "voice processor 560"), a wake-word engine 570, and at least one voice extractor 572, each of which is operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 are configured to provide detected sound, $S_D$, from the environment of the NMD 503 to the voice processor 560. The detected sound $S_D$ may take the form of one or more analog or digital signals. In example implementations, the detected sound $S_D$ may be composed of a plurality signals associated with respective channels 562 that are fed to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the voice processor 560 includes acoustic echo cancellation components (AEC) 564, a spatial processor 566, voice activity detector (VAD) components 560, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

During operations of the NMD 503, the voice activity detector 550 can process the detected sound $S_D$ to determine whether speech is present. Certain operations may be performed only if voice activity is detected. In various examples, the voice activity detector 550 may perform certain processing functions such that the input to the voice activity detector 550 is not identical to the output provided to downstream components within the VCC 560. For example, the voice activity detector 550 may buffer and/or time-delay the signal, may perform channel selection, or any other suitable pre-processing steps. If, voice activity is not identified in the detected sound $S_D$ via the voice activity detector 550, then the further processing steps may be forgone. For example, the sound data may not be passed to downstream components. Additionally or alternatively, the downstream components can be configured to forgo processing the incoming sound data $S_D$, such as by the use of bypass tags or other techniques. In some examples, the downstream components (e.g., other components within the VCC 560, wake-word engine 570), voice extractor 572, network interface 224) can remain in a standby, disabled, or low-power state until voice activity is detected via the voice activity detector 550, at which point some or all of these downstream components can transition to a higher-power or fully operational state. When transitioning from the low-power, standby, or disabled stage to a fully operational stage, any number of components may be turned on, supplied power or additional power, taken out of standby or sleep stage, or otherwise activated in such a way that the enabled component(s) are allowed to draw more power than they could when disabled. With this arrangement, the NMD 503 can assume a relatively low-power stage while monitoring for speech activity via the voice activity detector 550. Unless and until the voice activity detector 550 identifies voice activity, the NMD 503 may remain in the low-power stage. In some examples, after transitioning to the higher-power or fully operational stage, the NMD 503 may revert to the low-power or standby stage once voice input is no longer detected via the voice activity detector 550, after a VAS interaction is determined to be concluded, and/or once a given period of time has elapsed.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

The wake-word engine 570 is configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake-word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some examples, the wake-word engine 570 runs multiple wake word detection algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection algorithm for each supported voice service in parallel. In such examples, the network microphone device 103 may include VAS selector components 574 configured to pass voice input to the appropriate voice assistant service. In other examples, the VAS selector components 574 may be omitted. In some examples, individual NMDs 103 of the MPS 100 may be configured to run different wake word detection algorithms associated with particular VASes. For example, the NMDs of play back devices 102a and 102b of the Living Room may be associated with AMAZON's ALEXAR, and be configured to run a corresponding wake word detection algorithm (e.g., configured to detect the wake word "Alexa" or other associated wake word), while the NMD of play back device 102f in the Kitchen may be associated with GOOGLE's Assistant, and be configured to run a corresponding wake word detection algorithm (e.g., configured to detect the wake word "OK, Google" or other associated wake word).

In some examples, a network microphone device may include speech processing components configured to further facilitate voice processing, such as by performing voice recognition trained to recognize a particular user or a particular set of users associated with a household. Voice recognition software may implement voice-processing algorithms that are tuned to specific voice profile(s).

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream voice activity detector 550, AEC 564, and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some examples, a frame may include a portion of sound (e.g., one or more samples of a given sound specimen) and metadata regarding the portion of sound. In other examples, a frame may only include a portion of sound (e.g., one or more samples of a given sound specimen) or metadata regarding a portion of sound.

The voice processor 560 also includes at least one lookback buffer 569, which may be part of or separate from the memory 213 (FIG. 2A). In operation, the lookback buffer 569 can store sound metadata that is processed based on the detected-sound data $S_D$ received from the microphones 222. As noted above, the microphones 222 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure: (4) arbitration statistics (e.g., signal and noise estimates for the spatial processing streams associated with different microphones): and/or (5) speech spectral data (i.e., frequency response evaluated on processed audio output after acoustic echo cancellation and spatial processing have been performed). Other sound metadata may also be used to identify and/or classify noise in the detected-sound data $S_D$. In at least some examples, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$.

In any case, components of the NMD 503 downstream of the voice processor 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. When the wake-word engine 570 spots a potential wake word, the wake-word engine 570) can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570) indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

Figure 6A:
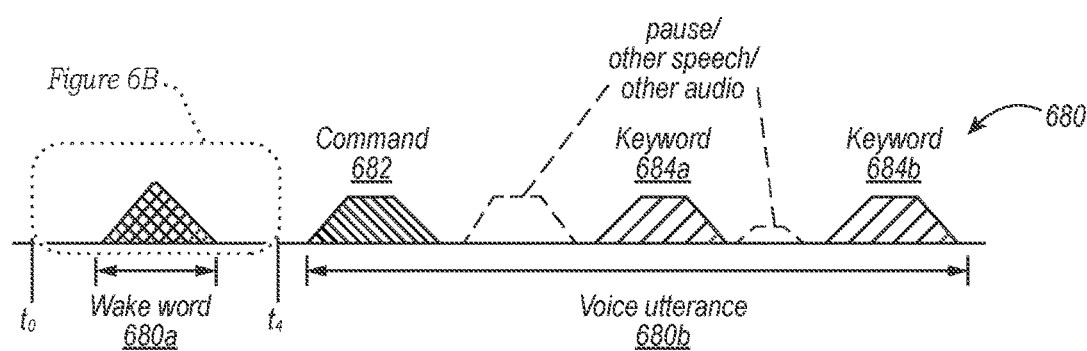
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake-word portion 680a and an utterance portion 680b. The wake-word portion 680a corresponds to detected sound that caused the wake-word event. For instance, the wake-word portion 680a corresponds to detected sound that caused the wake-word engine 570 to provide an indication of a wake-word event to the voice extractor 572. The utterance portion 680b corresponds to detected sound that potentially comprises a user request following the wake-word portion 680a.

Figure 6B:
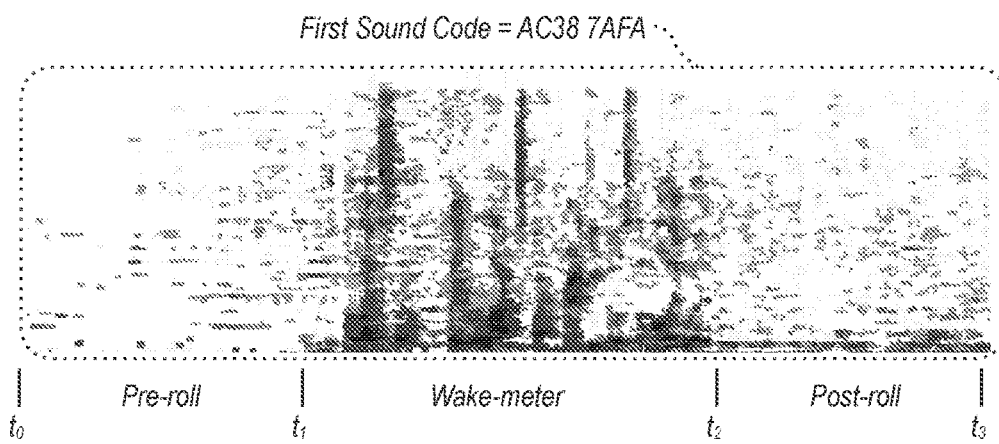
FIG. 6B is a graph depicting an example sound specimen in accordance with aspects of the disclosure.

As an illustrative example, FIG. 6B shows an example first sound specimen. In this example, the sound specimen corresponds to the sound-data stream $S_{DS}$ (e.g., one or more audio frames) associated with the spotted wake word 680a of FIG. 6A. As illustrated, the example first sound specimen comprises sound detected in the playback device 102i's environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680a within the sound-data stream $S_{DS}$ to verify the presence of the wake word. In some instances, the VAS may determine that the wake-word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680a but instead processes only the utterance portion 680b.

In any case, the VAS processes the utterance portion 680b to identify the presence of any words in the detected-sound data and to determine an underlying intent from these words. The words may correspond to a certain command and certain keywords 684 (identified individually in FIG. 6A as a first keyword 684a and a second keyword 684b). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680b may include additional information, such as detected pauses (e.g., periods of non-speech) between words spoken by a user, as shown in FIG. 6A. The pauses may demarcate the locations of separate commands, keywords, or other information spoke by the user within the utterance portion 680b.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and play back state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate play back on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570a, the second wake-word engine 570b, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the first wake-word engine 570a may be configured to identify the wake word "Alexa" and cause the NMD 503 to invoke the AMAZON VAS when "Alexa" is spotted. As another example, the second wake-word engine 570b may be configured to identify the wake word "Ok, Google" and cause the NMD 503 to invoke the GOOGLE VAS when "Ok. Google" is spotted. In single-VAS implementations, the VAS selector 574 may be omitted.

In additional or alternative implementations, the NMD 503 may include other voice-input identification engines 571

(shown in dashed lines) that enable the NMD 503 to operate without the assistance of a remote VAS. As an example, such an engine may identify in detected sound certain commands (e.g., "play," "pause." "turn on." etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office play back device 102n, either directly, or indirectly via one or more other devices of the MPS 100, which causes the office device 102n to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Noise Reduction Using Synthetic Audio

As shown in FIG. 5, the NMD 503 can include voice capture components (VCC) that receive the input sound data $S_D$ from the microphones 222 and process the sound data $S_D$ to perform appropriate downstream actions. In some implementations, the microphones 222 of the NMD 503 can include multiple different types of microphones, each of which may have different performance characteristics. As described in more detail below, the outputs from different types of microphones can be compared, combined, processed, and/or modified in a manner that improves voice detection via the NMD 503. For example, in high-noise conditions, audio captured via a first type of microphone (e.g., a bone-conduction microphone) can be used to compensate for noise detected via a second type of microphone (e.g., an air-conduction microphone). In some examples, audio captured via a first type of microphone (e.g., a bone-conduction microphone) can be processed using a model to synthesize sound data that mimics or simulates audio captured via a second microphone type (e.g., an air-conduction microphone) during low-noise conditions. This synthetic sound data can then be used in conjunction with sound data captured via the second microphone type (e.g., audio captured via air-conduction microphones) to produce an output for downstream processing.

Figure 7:
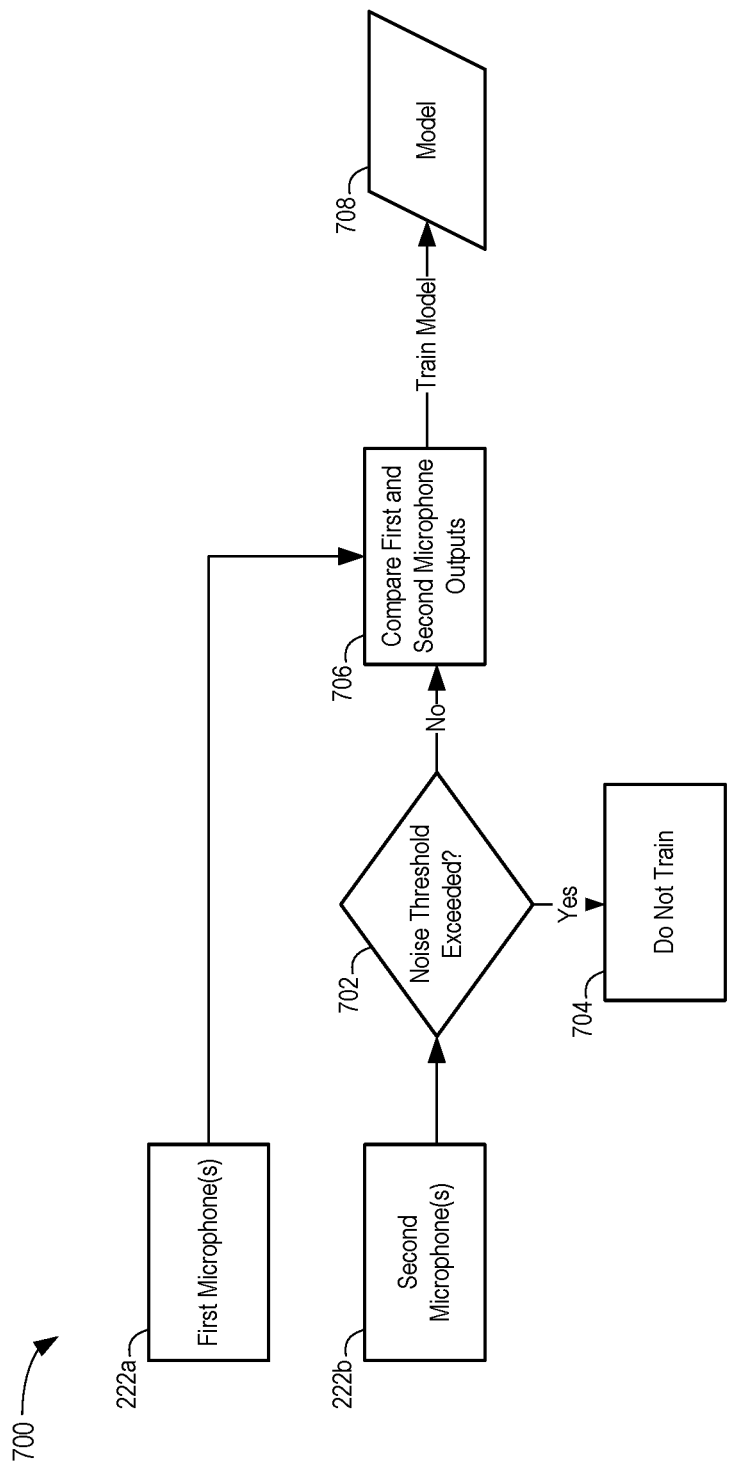
FIG. 7 is a schematic diagram of a process for training a synthetic sound model in accordance with examples of the present technology.

FIG. 7 illustrates a schematic block diagram of a process 700 for training a model for generation of synthetic sound data. The process 700 can be implemented by any of the NMDs disclosed and/or described herein, or any other NMD now known or later developed. Various examples of process 700 include one or more operations, functions, and actions. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In some examples, the process 700 shown in FIG. 7 is performed only when voice activity is detected via one or both of the first microphone(s) 222a or the second microphone(s) 222b. The NMD can use any suitable technique for detecting voice activity in the sound data. For example, certain acoustic features can be extracted from the sound data, such as energy-based features (e.g., signal-to-noise ratio), periodicity (e.g., speech signals tend to be more periodic than background noises), speech signal dynamics (e.g., analyzing the variance of power envelopes). One or more such acoustic features can then be analyzed using statistical models or other discriminators to detect voice activity in the sound data.

With reference to FIG. 7, audio can be detected concurrently via one or more first microphone(s) 222a and one or more second microphone(s) 222b. In various examples, the first and second microphones can differ among one or more performance characteristics or types. In some implementations, the first microphone(s) 222a can be bone-conduction microphone(s) (e.g., including transducers configured to detect vibrations in the user's skull, jawbone, or other bone that correspond to the user's voice output), while the second microphone(s) 222b can be conventional air-conduction microphone(s).

In block 702, the process 700 involves determining whether a noise threshold is exceeded. In particular, the output of the second microphone(s) 222b (e.g., air-conduction microphones) can be analyzed to determine whether noise is present. This analysis can include calculating a signal-to-noise ratio of the output signal. Additionally or alternatively, various characteristics of the output signals can be evaluated (e.g., frequency distributions, etc.) to determine whether or not noise is detected that exceeds a predetermined threshold. If noise is determined to be present at a level that exceeds a predetermined threshold, then in block 704 the model is not trained. This approach ensures that the model is only trained when conditions are favorable (i.e., noise levels are low).

If, in block 702, the noise threshold is not exceeded, then in block 706 the output of the first microphone(s) 222a and the output of the second microphone(s) 222b are compared to one another. This comparison is then used to train the model 708. The model 708 can be a mathematical model implemented in software and/or hardware that modifies the output of the first microphone(s) 222a such that it corresponds more closely to the concurrently captured output of the second microphone(s) 222b. For example, for a given voice input, audio captured via bone conduction microphones will tend to be lower quality (e.g., muffled, a loss of high-frequency content) as compared to audio captured via air-conduction microphones. The model 708 can be constructed so as to modify the audio captured via the bone-conduction microphone(s) to replicate or simulate the audio captured via the air-conduction microphones. The model can therefore be configured to produce synthetic audio that differs from the input along one or more dimensions or characteristics. The model can take any suitable form, for example, machine-learning algorithms, neural network algorithms, deep neural networks (DNNs), convolutional neural networks (CNNs), or recurrent neural networks (RNNs), or other appropriate model. In some examples, the synthetic audio generated via the model includes newly generated content that was not present in the output of the first microphone(s) 222a (e.g., the model 708 can be configured to generate new high-frequency content that was not present in the output of the first microphone(s) 222a).

In some examples, the model 708 can be trained according to a particular user's voice, and there may be several distinct models 708 that are each trained on a different user's voice. For example, in a household with two users, Alice and Bob, a first model 708 can be trained and utilized that generates synthetic audio for audio corresponding to Alice's voice input, while a second model 708 can be trained and utilized that generates synthetic audio corresponding to Bob's voice input. In such instances, a user voice-recognition process may be performed using the output of the first microphone(s) 222a and/or second microphone(s) 222b that identifies which particular user is speaking. While Alice is speaking, the model corresponding to Alice's voice can be trained and/or updated, and while Bob is speaking, the model corresponding to that Bob's voice can be trained and/or updated.

Figure 8:
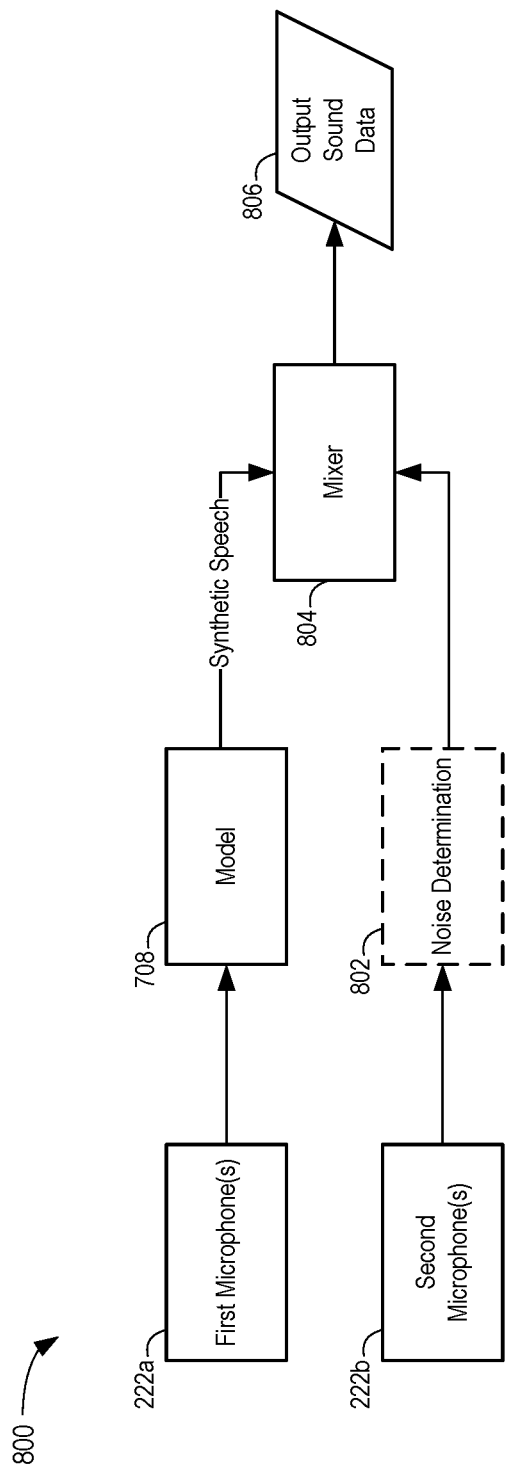
FIG. 8 is a schematic diagram of a process for mixing synthetic sound and original sound for audio output in accordance with examples of the present technology.

FIG. 8 shows an example of a process 800 for one or more NMDs to generate synthetic audio using the model 708 generated via the process 700 of FIG. 7. In operation, this synthetic audio can be used to improve audio quality for voice detection or other downstream processes. The process 800 can be implemented by any of the NMDs disclosed and/or described herein, or any other NMD now known or later developed. Various examples of process 800 include one or more operations, functions, and actions. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In operation, audio can be concurrently detected via the first microphone(s) 222a and the second microphone(s) 222b. As described previously with respect to FIG. 7, in some implementations the first microphone(s) 222a can take the form of bone-conduction microphone(s), while the second microphone(s) 222b can take the form of air-conduction microphones, though these configurations can vary in different instances. As shown in FIG. 8, the output of the first microphone(s) 222a can be provided to the model 708. As noted previously, the model 708 can be configured to modify the received audio input so as to simulate or more closely mimic the audio that would be captured via the second microphone(s) 222b in the absence of noise. The output of the model 708 is synthetic speech (or synthetic audio generally if the captured audio is not a user's voice input), which is provided to a mixer 804.

In parallel with the generation of synthetic speech via the model 708, the output of the second microphone(s) 222b can optionally be provided to noise determination components 802, though this operation can be omitted in some examples. The noise determination in block 802 can involve a determination of whether noise is present (either as a binary output of whether noise exceeds a predetermined threshold, as an output that indicates a relative noise level, or as any other output that indicates a presence or absence of noise). Additionally or alternatively, the noise determination in block 802 can involve a determination or characterization of the particular type of noise present in the output of the second microphone(s) 222b.

In various examples, this noise determination can use any known techniques. Such noise classification can include the use of machine-learned models that are trained on pre-existing data sets of different noise types. The classification can be based on frequency response, temporal signatures, or any other aspects of the audio data that can be usefully applied for discriminating between noise/no-noise conditions as well as discriminating between different types of noise (e.g., traffic, wind, fan, etc.). In various examples, any number of different techniques for classification of noise using the sound data or metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Additional details of noise classification using an NMD as described herein are shown and described in commonly owned U.S. Pat. No. 10,602,268, issued Mar. 24, 2020, which is hereby incorporated by reference in its entirety.

Figure 9:
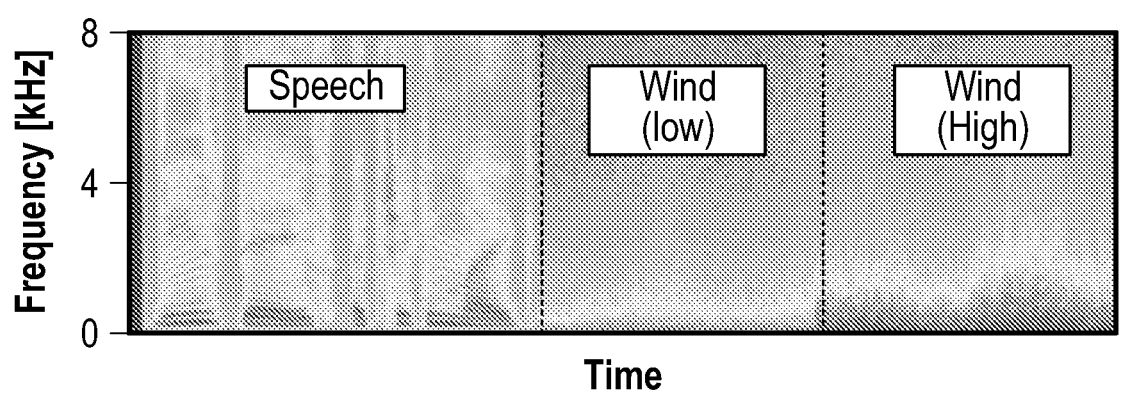
FIG. 9 illustrates example spectrograms for speech, low wind noise, and high wind noise conditions.

FIG. 9 illustrates example spectrograms for speech, low wind noise, and high wind noise conditions. As seen in FIG. 9, the spectral characteristics for each of these conditions are clearly distinguishable from one another. By analyzing these characteristics (e.g., in the noise determination in block 802 and/or in a voice activity detection process), speech, low noise, and high noise conditions can be identified. These determinations can then be used to inform downstream processing (e.g., as input to the mixer 804 as described in more detail below).

Following the noise determination in block 802, the output (e.g., the output of the second microphone(s) 222b and/or any data obtained via the noise determination in block 802) are provided to the mixer 804, along with the synthetic speech produced via the model 708. The mixer 804 can then combine, modify, manipulate, or select between and among these inputs to produce output sound data 806. The output sound data 806 can be provided to the voice capture components 566 (FIG. 5) for further processing, including optionally wake-word detection for communication with one or more voice assistant services.

With reference to the mixer 804 shown in FIG. 8, the particular mixing can take a number of different forms. In some examples, mixing includes the superposition of the two outputs with relative volume levels set to the desired levels. For example, synthetic audio (obtained via the model 708) can be output at 40% standard volume while original audio (obtained from second microphone(s) 222b) can be simultaneously output at 60% standard volume. In some examples, the relative volume levels can be dynamically adjusted over time depending on the particular noise conditions and other operating characteristics. In some examples, the mixing can include utilizing the air-conduction output over a first frequency range and utilizing the synthetic audio output over a second frequency range, which may partially overlap the first or may be non-overlapping with the first. For example, frequencies above a predetermined threshold can be obtained from the synthetic audio output, while frequencies below the predetermined threshold can be obtained from the air-conduction audio output. In various examples, any suitable technique can be used to combine, mix, aggregate, or merge the air-conduction audio and the synthetic audio streams for downstream audio processing.

Although several examples herein refer to air-conduction and bone-conduction microphones as examples of different microphone types, in some instances the different microphone types may take other forms. For example, microphones may vary in accordance with sensitivity, directionality, frequency response, or any other performance characteristic, whether or not such microphones are configured to detect sound via air-conduction, bone-conduction, or any other modality.

In accordance with some examples, the different microphones (e.g., first and second microphones 222a and 222b such as bone-conduction and air-conduction microphones) can be disposed within a common housing and operate as part of a single NMD. In some examples, the different microphones can be disposed within separate housings and as part of separate and discrete NMDs. For example, a first NMD may include the first microphones 222a and a second NMD across the room may include the second microphones 222b. In operation, audio detected via the first microphones 222a of the first NMD can be combined with audio detected via the second microphones 222b of the second NMD in a manner that improves audio quality and/or enhances voice detection. Such an approach may be useful when, for example, one NMD is subject to greater noise than the other NMD (e.g., one NMD is near the dishwasher and so may be subject to greater environmental noise from the dishwasher running than another NMD in an adjacent room). In such instances, audio detected via the second NMD, although likely fainter than the voice input detected via the first NMD, can be used to enhance the audio quality for voice detection or other downstream audio processing steps.

For example, consider a scenario in which a first NMD and a second NMD concurrently capture audio from the same source such as a user's voice input. When the first NMD is closer to the user than the second NMD, the first NMD may capture a higher quality sound data based on the voice input. However, if the first NMD is also nearer to a noise source (e.g., a kitchen faucet), then audio captured via the second NMD may be used (optionally with the aid of a synthetic sound model) to be combined with, substitute, augment, or otherwise mixed with the audio captured via the first NMD in a manner that improves overall audio quality and downstream voice processing.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring aspects of the examples. Accordingly, the scope of the present disclosure is defined by the appended claims rather than the forgoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Examples

The present technology is illustrated, for example, according to various aspects described below: Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1. One or more playback devices comprising: a first one or more microphones: a second one or more microphones: one or more processors: and data storage having instructions stored thereon that, when executed by the one or more processors, cause the one or more playback devices to perform operations comprising: capturing a first sound data stream based on a user voice input via the first one or more microphones: while capturing the first sound data stream, (i) concurrently capturing a second sound data stream based on the user voice input via the second one or more microphones and (ii) evaluating the first sound data stream to determine whether a noise threshold is exceeded: while the noise threshold is not exceeded, training a synthetic sound data model based on the first sound data stream and the second sound data stream concurrently captured with first sound data: communicating an output audio stream to at least one second play back device based on the first sound data stream: detecting noise in the first sound data stream; and mixing a synthetic audio stream into the output audio stream based on the noise in the first sound data, wherein the synthetic audio stream is produced based on the synthetic sound data model.

Example 2. The one or more playback devices of any of the preceding Examples, wherein the operations further comprise: detecting that the noise is no longer present in the first sound data stream: and ceasing the mixing of the synthetic audio stream into the output audio stream after detecting that the noise is no longer present in the first audio stream.

Example 3. The one or more playback devices of any of the preceding Examples, wherein the first one or more microphones comprises an air-conduction microphone and the second one or more microphones comprises a bone-conduction microphone.

Example 4. The one or more playback devices of any of the preceding Examples, wherein the at least one first playback device comprises a portable playback device comprising the first and second microphones.

Example 5. The one or more playback devices of any of the preceding Examples, wherein the mixing is based at least in part on a determined noise level in the second sound data.

Example 6. The one or more playback devices of any of the preceding Examples, wherein the mixing comprises utilizing the synthetic sound data over a first frequency range and utilizing the second sound data over a second frequency range different from the first.

Example 7. The one or more playback devices of any of the preceding Examples, wherein the mixing comprises combining first sound data stream at a first relative volume level with the synthetic audio stream at a second relative volume level.

Example 8. The one or more playback devices of any of the preceding Examples, wherein the mixing comprises dynamically switching between the first sound data stream and the synthetic audio stream.

Example 9. A method comprising: capturing a first sound data stream based on a user voice input via a first one or more microphones of at least one first playback device: while capturing the first sound data stream, (i) concurrently capturing a second sound data stream based on the user voice input via a second one or more microphones of the at least one first playback device and (ii) evaluating the first sound data stream to determine whether a noise threshold is exceeded: while the noise threshold is not exceeded, training a synthetic sound data model based on the first sound data stream and the second sound data stream concurrently captured with first sound data: communicating an output audio stream to at least one second playback device based on the first sound data stream: detecting noise in the first sound data stream: and mixing a synthetic audio stream into the output audio stream based on the noise in the first sound data, wherein the synthetic audio stream is produced based on the synthetic sound data model.

Example 10. The method of any of the preceding Examples, further comprising: detecting that the noise is no longer present in the first sound data stream: and ceasing the mixing of the synthetic audio stream into the output audio stream after detecting that the noise is no longer present in the first audio stream.

Example 11. The method of any of the preceding Examples, wherein the first one or more microphones comprises an air-conduction microphone and the second one or more microphones comprises a bone-conduction microphone.

Example 12. The method of any of the preceding Examples, wherein the at least one first playback device comprises a portable playback device comprising the first and second microphones.

Example 13. The method of any of the preceding Examples, wherein the mixing is based at least in part on a determined noise level in the second sound data.

Example 14. The method of any of the preceding Examples wherein the mixing comprises utilizing the synthetic sound data over a first frequency range and utilizing the second sound data over a second frequency range different from the first.

Example 15. The method of any of the preceding Examples, wherein the mixing comprises combining first sound data stream at a first relative volume level with the synthetic audio stream at a second relative volume level.

Example 16. The method of any of the preceding Examples, wherein the mixing comprises dynamically switching between the first sound data stream and the synthetic audio stream.

Example 17. One or more tangible, non-transitory computer-readable media comprising instructions that, when executed by one or more processors of at least one play back device, cause the at least one playback device to perform operations comprising: capturing a first sound data stream based on a user voice input via a first one or more microphones of the at least one play back device: while capturing the first sound data stream, (i) concurrently capturing a second sound data stream based on the user voice input via a second one or more microphones of the at least one playback device and (ii) evaluating the first sound data stream to determine whether a noise threshold is exceeded: while the noise threshold is not exceeded, training a synthetic sound data model based on the first sound data stream and the second sound data stream concurrently captured with first sound data: communicating an output audio stream to at least one second playback device based on the first sound data stream: detecting noise in the first sound data stream; and mixing a synthetic audio stream into the output audio stream based on the noise in the first sound data, wherein the synthetic audio stream is produced based on the synthetic sound data model.

Example 18. The computer-readable media of any of the preceding Examples, wherein the operations further comprise: detecting that the noise is no longer present in the first sound data stream: and ceasing the mixing of the synthetic audio stream into the output audio stream after detecting that the noise is no longer present in the first audio stream.

Example 19. The computer-readable media of any of the preceding Examples, wherein the mixing is based at least in part on a determined noise level in the second sound data.

Example 20. The computer-readable media of any of the preceding Examples, wherein the mixing comprises at least one of: utilizing the synthetic sound data over a first frequency range and utilizing the second sound data over a second frequency range different from the first; combining first sound data stream at a first relative volume level with the synthetic audio stream at a second relative volume level; or the mixing comprises dynamically switching between the first sound data stream and the synthetic audio stream.

The invention claimed is:
1. One or more playback devices comprising:
   a first one or more microphones;
   a second one or more microphones;
   one or more processors; and
   data storage having instructions stored thereon that, when executed by the one or more processors, cause the one or more playback devices to perform operations comprising:
      capturing a first sound data stream based on a user voice input via the first one or more microphones;
      while capturing the first sound data stream, (i) concurrently capturing a second sound data stream based on the user voice input via the second one or more microphones and (ii) evaluating the first sound data stream to determine whether a noise threshold is exceeded;
      while the noise threshold is not exceeded, training a synthetic sound data model based on the first sound data stream and the second sound data stream concurrently captured with first sound data;
      communicating an output audio stream to at least one second playback device based on the first sound data stream;
      detecting noise in the first sound data stream; and
      mixing a synthetic audio stream into the output audio stream based on the noise in the first sound data stream, wherein the synthetic audio stream is produced based on the synthetic sound data model.

2. The one or more playback devices of claim 1, wherein the operations further comprise:
   detecting that the noise is no longer present in the first sound data stream; and
   ceasing the mixing of the synthetic audio stream into the output audio stream after detecting that the noise is no longer present in the first sound data stream.

3. The one or more playback devices of claim 1, wherein the first one or more microphones comprises an air-conduction microphone and the second one or more microphones comprises a bone-conduction microphone.

4. The one or more playback devices of claim 1, wherein the one or more playback devices comprises a portable playback device comprising the first and second microphones.

5. The one or more playback devices of claim 1, wherein the mixing is based at least in part on a determined noise level in the second sound data stream.

6. The one or more playback devices of claim 1, wherein the mixing comprises utilizing the synthetic sound data model over a first frequency range and utilizing the second sound data stream over a second frequency range different from the first.

7. The one or more playback devices of claim 1, wherein the mixing comprises combining the first sound data stream at a first relative volume level with the synthetic audio stream at a second relative volume level.

8. The one or more playback devices of claim 1, wherein the mixing comprises dynamically switching between the first sound data stream and the synthetic audio stream.

9. A method comprising:
   capturing a first sound data stream based on a user voice input via a first one or more microphones of at least one first playback device;
   while capturing the first sound data stream, (i) concurrently capturing a second sound data stream based on the user voice input via a second one or more microphones of the at least one first playback device and (ii) evaluating the first sound data stream to determine whether a noise threshold is exceeded;
   while the noise threshold is not exceeded, training a synthetic sound data model based on the first sound data stream and the second sound data stream concurrently captured with first sound data;
   communicating an output audio stream to at least one second playback device based on the first sound data stream;
   detecting noise in the first sound data stream; and
   mixing a synthetic audio stream into the output audio stream based on the noise in the first sound data stream, wherein the synthetic audio stream is produced based on the synthetic sound data model.

10. The method of claim 9, further comprising:
    detecting that the noise is no longer present in the first sound data stream; and
    ceasing the mixing of the synthetic audio stream into the output audio stream after detecting that the noise is no longer present in the first sound data stream.

11. The method of claim 9, wherein the first one or more microphones comprises an air-conduction microphone and the second one or more microphones comprises a bone-conduction microphone.

12. The method of claim 9, wherein the at least one first playback device comprises a portable playback device comprising the first and second microphones.

13. The method of claim 9, wherein the mixing is based at least in part on a determined noise level in the second sound data stream.

14. The method of claim 9, wherein the mixing comprises utilizing the synthetic sound data model over a first frequency range and utilizing the second sound data stream over a second frequency range different from the first.

15. The method of claim 9, wherein the mixing comprises combining the first sound data stream at a first relative volume level with the synthetic audio stream at a second relative volume level.

16. The method of claim 9, wherein the mixing comprises dynamically switching between the first sound data stream and the synthetic audio stream.

17. One or more tangible, non-transitory computer-readable media comprising instructions that, when executed by one or more processors of at least one playback device, cause the at least one playback device to perform operations comprising:
    capturing a first sound data stream based on a user voice input via a first one or more microphones of the at least one playback device;
    while capturing the first sound data stream, (i) concurrently capturing a second sound data stream based on the user voice input via a second one or more microphones of the at least one playback device and (ii) evaluating the first sound data stream to determine whether a noise threshold is exceeded;
    while the noise threshold is not exceeded, training a synthetic sound data model based on the first sound data stream and the second sound data stream concurrently captured with first sound data;
    communicating an output audio stream to at least one second playback device based on the first sound data stream;
    detecting noise in the first sound data stream; and
    mixing a synthetic audio stream into the output audio stream based on the noise in the first sound data stream, wherein the synthetic audio stream is produced based on the synthetic sound data model.

18. The computer-readable media of claim 17, wherein the operations further comprise:
    detecting that the noise is no longer pres3nt in the first sound data stream; and
    ceasing the mixing of the synthetic audio stream into the output audio stream after detecting that the noise is no longer present in the first sound data stream.

19. The computer-readable media of claim 17, wherein the mixing is based at least in part on a determined noise level in the second sound data stream.

20. The computer-readable media of claim 17, wherein the mixing comprises at least one of:
    utilizing the synthetic sound data model over a first frequency range and utilizing the second sound data stream over a second frequency range different from the first;
    combining the first sound data stream at a first relative volume level with the synthetic audio stream at a second relative volume level; or
    dynamically switching between the synthetic audio stream and the second sound data stream.

\* \* \* \* \*

UNITED STATES PATENT AND TRADEMARK OFFICE
CERTIFICATE OF CORRECTION

| | | |
|---|---|---|
| PATENT NO. | : 12,499,901 B2 | Page 1 of 1 |
| APPLICATION NO. | : 18/693411 | |
| DATED | : December 16, 2025 | |
| INVENTOR(S) | : Nesfield et al. | |

It is certified that error appears in the above-identified patent and that said Letters Patent is hereby corrected as shown below:

On the Title Page

Item (57), in Column 2, under "ABSTRACT", Line 6, delete "first and sound" and insert -- first and second sound --, therefor.

In the Claims

In Column 38, in Claim 18, Line 40, delete "pres3nt" and insert -- present --, therefor.

Signed and Sealed this
Third Day of February, 2026

John A. Squires
*Director of the United States Patent and Trademark Office*